United States Patent [19]

Rosenberger, Jr. et al.

[11] 3,714,903
[45] Feb. 6, 1973

[54] TAKEUP APPARATUS FOR TRUCK TOW CONVEYOR SYSTEM

[75] Inventors: Chester A. Rosenberger, Jr., Perkasie; Horace M. Swartz, Doylestown, both of Pa.

[73] Assignee: F M C Corporation, San Jose, Calif.

[22] Filed: Dec. 31, 1970

[21] Appl. No.: 103,096

[52] U.S. Cl..............................104/196, 104/172 BT
[51] Int. Cl................................................B65g 23/60
[58] Field of Search .... 104/172 C, 172 BT, 178, 196; 198/208

[56] References Cited

UNITED STATES PATENTS 3,389,662   6/1968   Jacoby.............................104/172 C

FOREIGN PATENTS OR APPLICATIONS 727,279   3/1955   Great Britain...................104/172 BT

*Primary Examiner*—Drayton E. Hoffman
*Assistant Examiner*—Robert Saifer
*Attorney*—F. W. Anderson and C. E. Tripp

[57] ABSTRACT

This invention involves a takeup apparatus for an endless chain in a materials handling truck tow conveying system. In particular, the endless chain operates in a shallow depth guideway immediately below the surface on which the truck operates, and spaced pusher-links in the chain engage a tow pin on the truck to propel the truck. In the takeup section, which is independent of the chain drive, the endless chain is trained around a horizontal adjustable sprocket, then backwards under the incoming section of the chain to an inclined fixed idler sprocket from which the outgoing section of chain is redirected in a straight line continuation of the original direction of the incoming chain section. At the truck tow pin transfer area, the incoming and outgoing chain sections are parallel and adjacent to each other with the outgoing section slightly depressed in elevation so the tow pin can slide out from a pocket in the pusher-link onto the top of the adjacent section of chain where the tow pin will be picked up by a closely following pusher-link.

21 Claims, 14 Drawing Figures

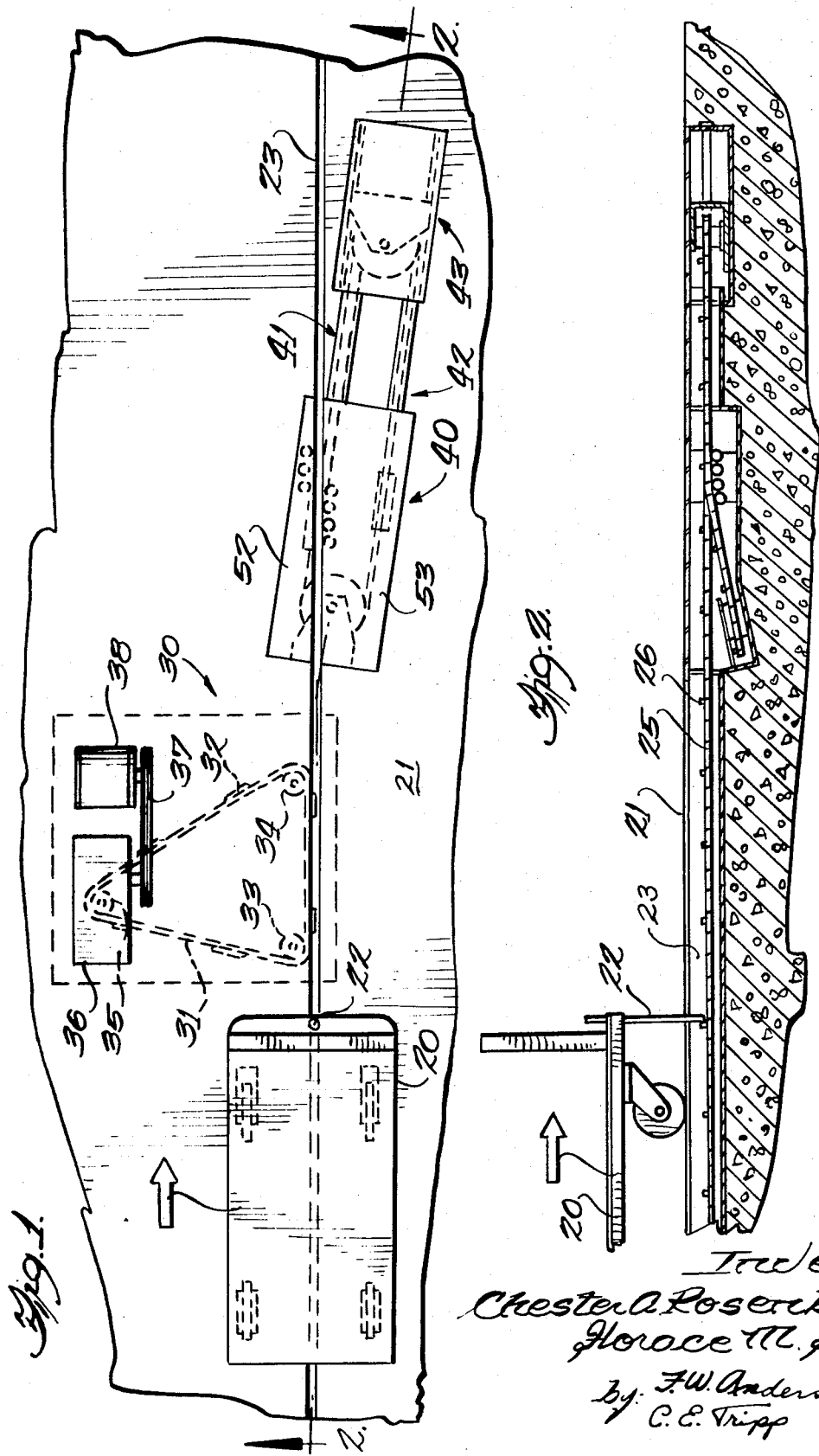

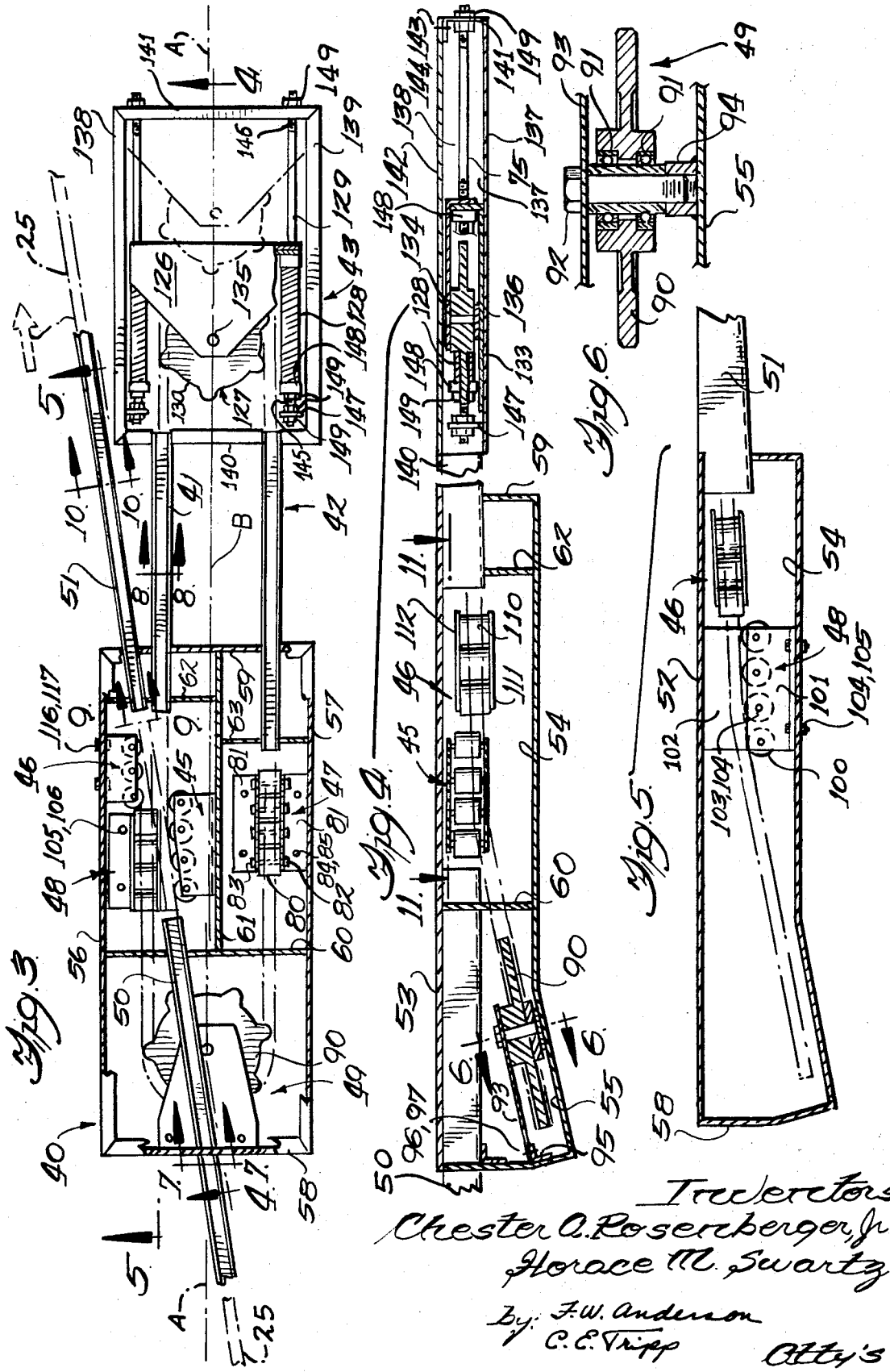

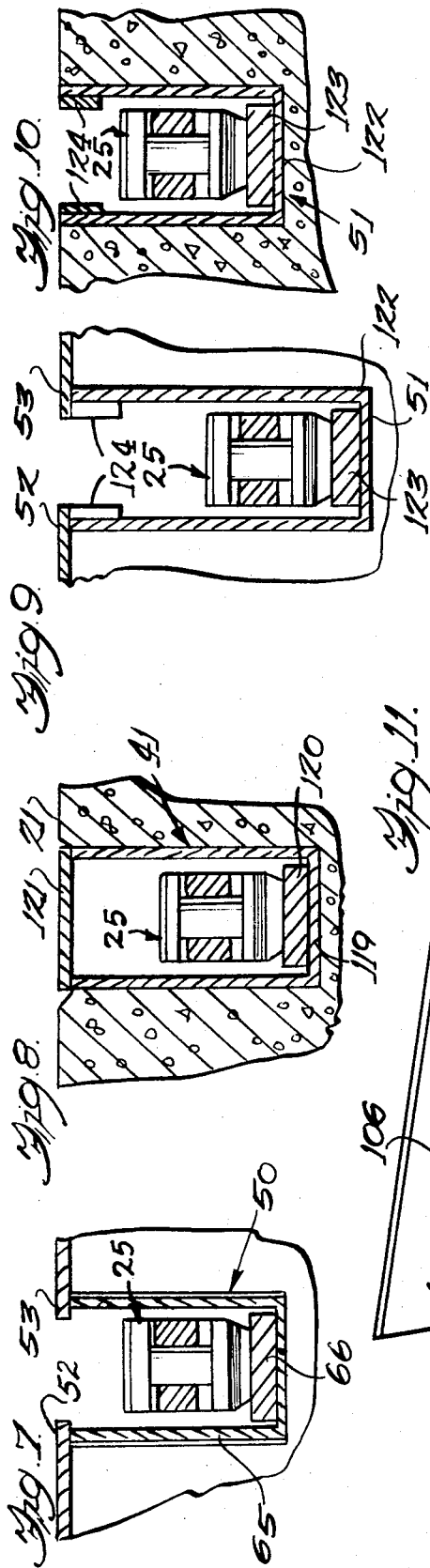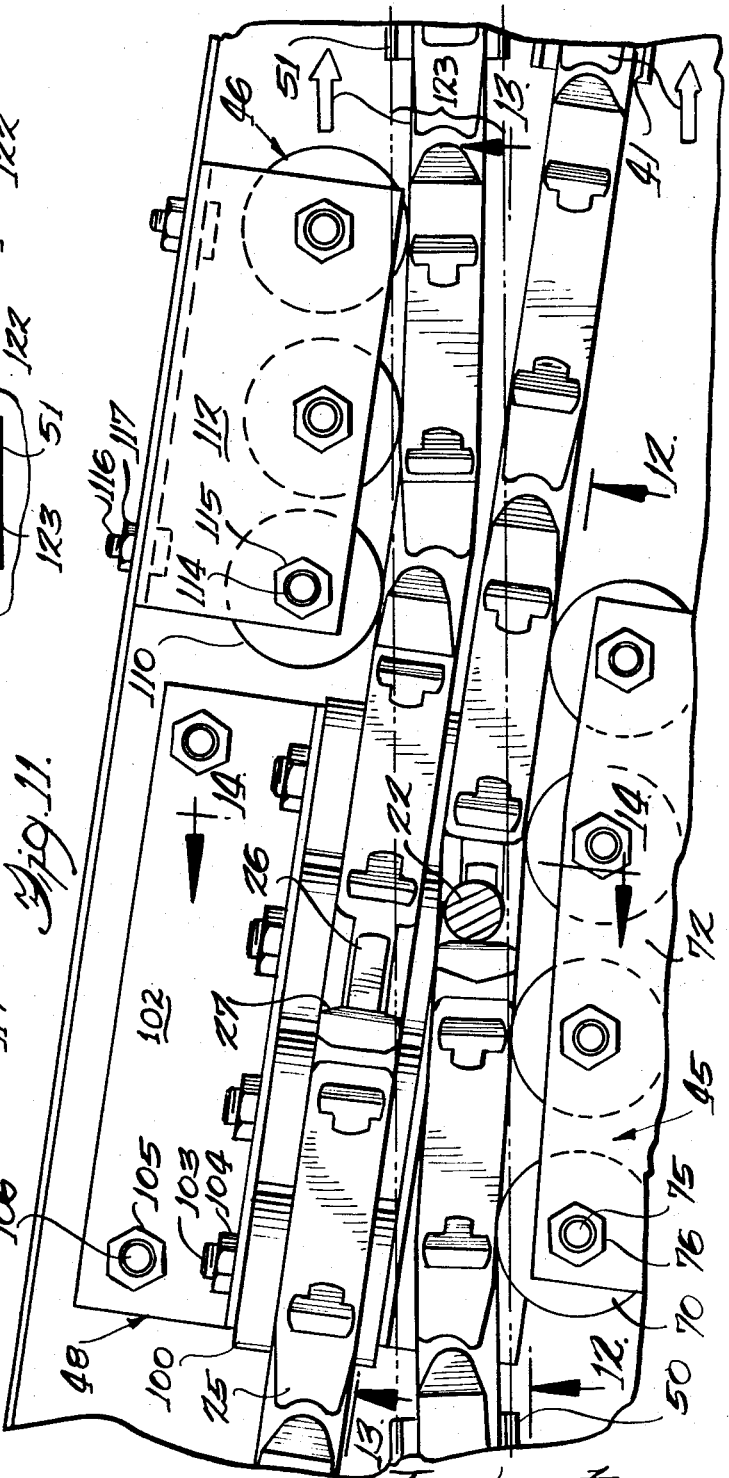

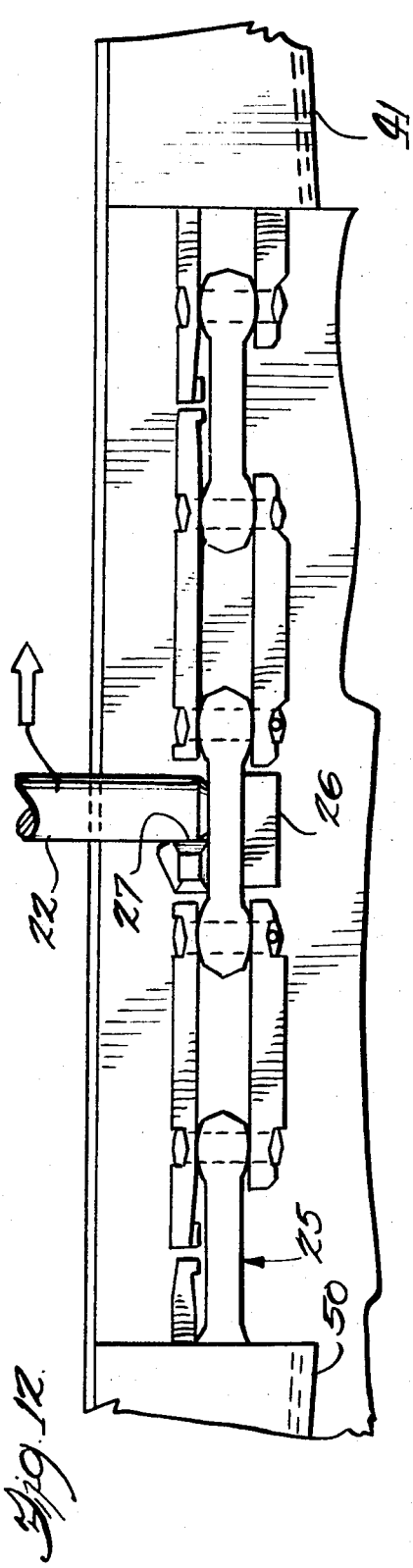
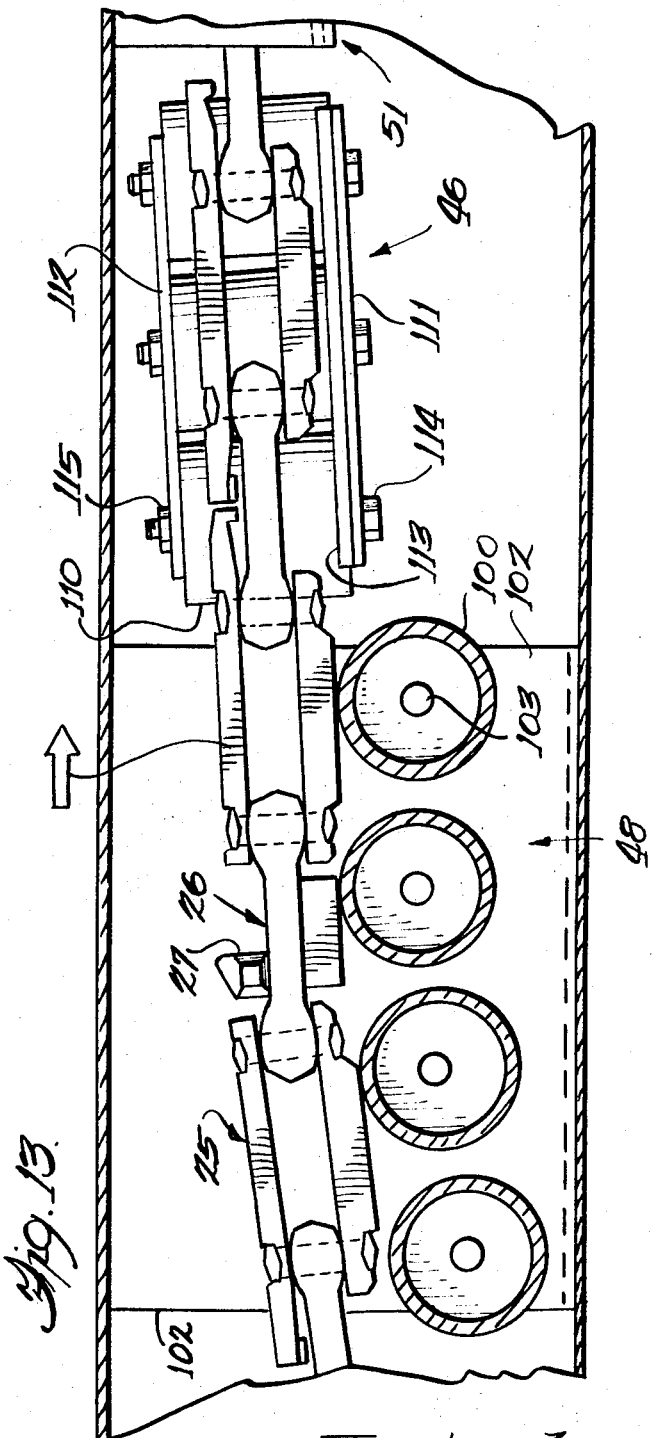

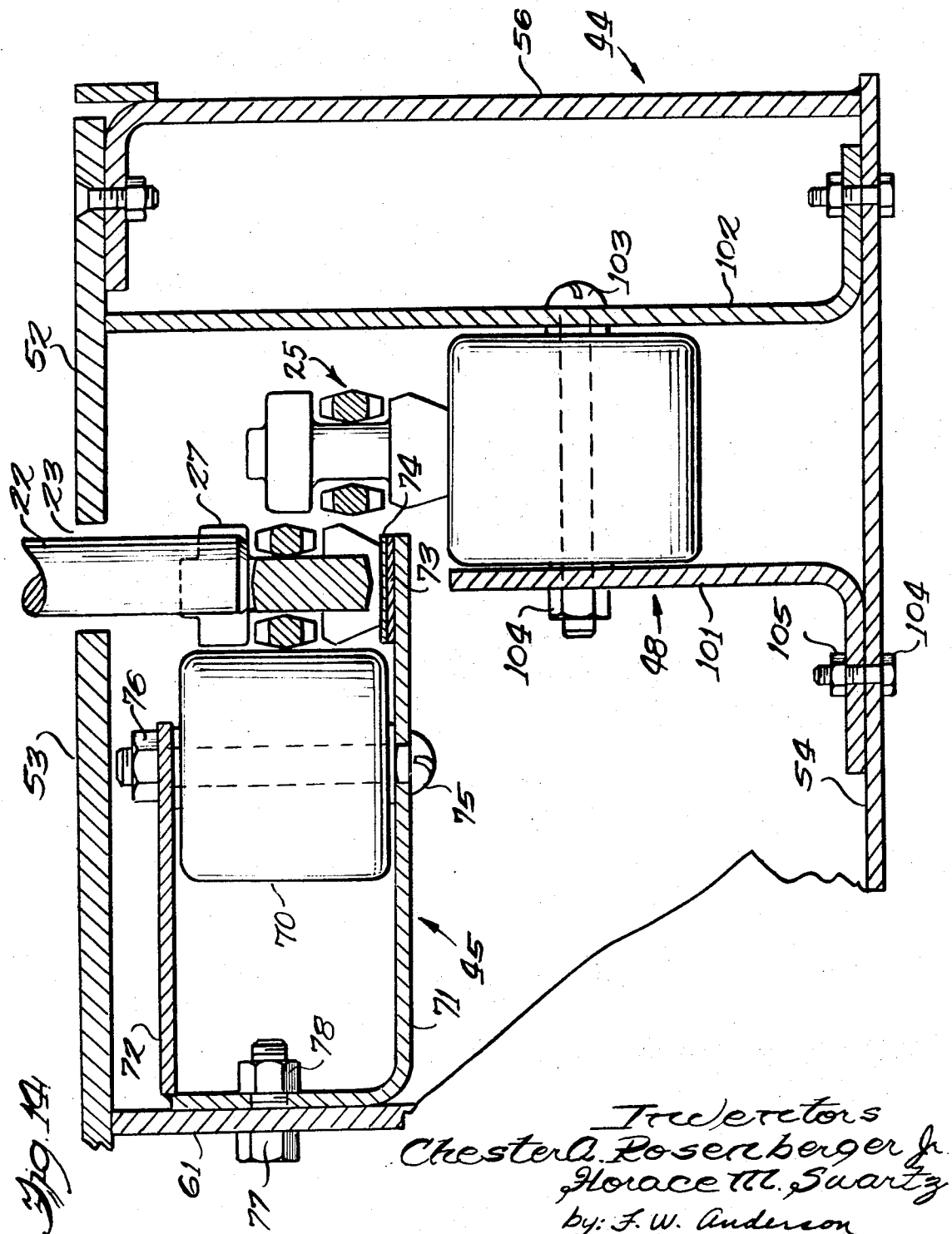

TAKEUP APPARATUS FOR TRUCK TOW CONVEYOR SYSTEM

BACKGROUND OF THE INVENTION

1. Field of the Invention

This invention relates to a low profile truck tow conveyor system wherein a materials handling truck has a vertically movable tow pin that drops below the surface on which the truck rolls and engages an endless chain operating in a guideway just below this surface. The chain is equipped with a pusher-link that engages the tow pin on the truck and propels the truck along the path of the conveyor. The takeup apparatus removes the accumulated slack in the conveying section of the endless chain due to wear while requiring pit depths only slightly deeper than the normal chain guideway.

2. Description of the Prior Art

In the earliest below-the-floor type truck tow conveyor systems, standard rivetless chain was suspended from roller equipped idlers and pushers operating in a track below the floor level. The resulting track occupied a trench of approximately 10 inches width and of approximately 11 inches depth with the centerline of the chain being approximately 6 inches below the floor level. In order to provide means for taking up the accumulated slack in the chain, a first vertical curve in the track had to be provided so the pusher on the chain could withdraw vertically from engagement with the tow pin, then the chain turned sideways from the tow pin slot around two 90° traction wheel turns so as to be parallel to the tow pin slot again. The vertical curve provided enough drop in elevation to get sufficiently below the main section of track to support an adjustable sprocket for the desired takeup. The chain was trained 180° around the adjustable sprocket and then backwards around two 90° fixed idler wheel turns so located that the outgoing chain was vertically below the main track. Then the track was provided with a pair of vertical curves so that the track returned to normal level and in line with the tow pin slot to pick up the tow pin on the truck again, but at a point approximately 5 feet beyond where the tow pin originally left the chain. This apparatus required a pit about 15 feet long by 6 feet wide by 6 feet deep so was space consuming and expensive. In most cases an auxiliary short conveyor had to be provided to propel the truck between the tow pin wipe-off point from the chain and the pick-up point to ensure positive movement of the truck across the transfer gap in the main line chain.

A later improvement in takeup apparatus for this type of conveyor involved the collapsing-chain technique wherein the rivetless chain was merely confined in a part of the track at the normal elevation and in line with the path of the conveyor. Standard rivetless chain has an upper and lower sidebar connected to an open center type of middle link so that when slack develops the chain pins with the upper and lower sidebar links can slide together in the center link until the two outer sidebars on adjacent links touch. This provides approximately 2-⅝ inches takeup in every 8 inches of 4 inch pitch chain and the desired length of takeup is provided by an appropriate length of confined track. In this takeup area the chain is confined in relatively close fitting guides so the chain cannot twist sideways while in this slack condition and thereby become accidentally uncoupled.

A combined drive and takeup means is disclosed in U.S. Pat. No. 3,389,662, issued to C. E. Jacoby on June 25, 1968. In this apparatus a special chain is used which has its coupling pins horizontal as compared to the vertical position when standard rivetless chain is used. The chain is wrapped around each of two vertical sprockets about 180° and the shaft mounting of one of these sprockets is provided with conventional horizontal adjustment to take up the accumulated slack in the endless conveyor chain by moving the sprocket and shaft. These sprockets are horizontally offset from each other slightly more than the width of the chain so that the incoming chain section is offset in a parallel direction from the outgoing chain section and a corresponding angular offset portion in the tow pin slot is necessary to transfer from one chain section to the next chain section.

SUMMARY OF THE INVENTION

In the low profile type of below-the-floor truck tow conveyor system, one of its major advantages is the extremely shallow depth of trenches and pits required for installation of the necessary conveyor equipment. This invention relates particularly to takeup apparatus for this type of conveyor system which requires very shallow pits. One type of chain which may be utilized in a conveyor of this type is disclosed in copending U.S. Pat. application Ser. No. 34,673, now U.S. Pat. No. 3,662,690 filed May 5, 1970. This chain has a substantially smooth and continuous top surface. The chain is a special rivetless type capable of articulation in both the vertical and horizontal planes and has a pusher-link at spaced intervals. This chain has only very limited collapsibility so a separate takeup is usually provided.

An incoming section of this chain is first deflected slightly around a horizontal curve roller turn and guided to and 180° around an adjustable sprocket wheel which is spring tensioned to provide automatic accommodation of any accumulated slack in the chain. From this adjustable sprocket the chain is guided downwardly over a vertical curve roller turn to a fixed, slightly inclined idler sprocket whose elevation is depressed below the level of the incoming section of chain and its guideway. After passing 180° around the fixed sprocket, the chain is guided upwardly over a vertical curve roller turn to return to an approximately horizontal plane. It then bends slightly around a horizontal curve roller turn so the outgoing chain section is in a plane that is a straight line extension of the path of the incoming chain section. After passing over the second vertical curve roller turn, the outgoing chain section becomes parallel and closely adjacent to the incoming chain section but the outgoing chain section is at an elevation slightly below the corresponding incoming chain section at this point. This is the transfer area in which the tow pin on the truck positively transfers sideways disengaging from the pusher-link of the first chain section to ride on top of the adjacent outgoing chain section until it re-engages with the next following pusher-link.

The tow pin is guided in a straight tow pin slot in the floor plates throughout the transfer area, while the chain sections below the floor plates follow different paths. The outgoing chain section has a pusher-link spaced slightly to the rear of the corresponding pusher-link on the incoming chain section so that at the transfer point the following pusher-link quickly engages the otherwise unpowered tow pin and continues to propel the truck. Thus the tow pin makes a very short transfer between the two chain sections, is quickly engaged by the following pusher-link on the outgoing chain to ensure a powered transfer, and the truck with its tow pin continues in a straight line path without any angular deviations at the takeup apparatus.

The slight difference in angle between the tow pin slot and the path of the chain around the adjustable takeup sprocket permits the sprocket to be located out of the path of the outgoing chain section and its guideways so the depth required for the housing for the takeup sprocket is only about 1 inch greater than the normal conveyor section which is only 3½ inches deep. The fixed idler sprocket is positioned on a slight incline so it is below the guideway of the incoming chain section and the end of the housing for the sprocket is only slightly over 12 inches at its maximum depth.

Accordingly, it is an object of this invention to provide an improved takeup apparatus for a low profile truck tow conveyor system.

Another object is to provide a takeup for the conveyor chain that is independent of, and may be separated from, the drive for the conveyor.

A further object is to provide a takeup for the conveyor chain that requires a very limited depth for its installation.

Another object is to provide a takeup apparatus in which the slack in the conveyor chain may be withdrawn without the truck of the truck tow system having to deviate from its normal straight path through the area of this takeup.

Still another object is to provide a takeup apparatus in which the tow pin of the truck is transferred from one section of the endless chain to another section in the minimum distance so a positive transfer between the two sections of the chain in the takeup is ensured.

BRIEF DESCRIPTION OF THE DRAWINGS

FIG. 1 is a partial schematic plan view of a low profile truck tow system using the takeup of the present invention.

FIG. 2 is a cross-sectional view of the conveyor taken along line 2—2 of FIG. 1.

FIG. 3 is an enlarged plan view of the takeup apparatus of this invention with the necessary cover plates removed.

FIG. 4 is a cross-sectional view of the takeup apparatus taken along line 4—4 of FIG. 3.

FIG. 5 is a cross-sectional view of the takeup apparatus taken along line 5—5 of FIG. 3.

FIG. 6 is a cross-sectional view of the fixed idler sprocket assembly taken along line 6—6 of FIG. 4.

FIG. 7 is a cross-sectional view of the incoming chain section and its guideway taken along line 7—7 of FIG. 3.

FIG. 8 is a cross-sectional view of the chain and its guideway between the adjustable sprocket and the fixed sprocket taken along line 8—8 of FIG. 3.

FIG. 9 is a cross-sectional view of the outgoing chain section at the start of its guideway taken along line 9—9 of FIG. 3.

FIG. 10 is a cross-sectional view of the outgoing chain section at the end of its guideway taken along line 10—10 of FIG. 3.

FIG. 11 is an enlarged plan view of the tow pin transfer area of the takeup under the floor plates taken along line 11—11 of FIG. 4.

FIG. 12 is a sectional elevation of the incoming chain section taken along line 12—12 of FIG. 11.

FIG. 13 is a sectional elevation of the outgoing chain section taken along line 13—13 of FIG. 11.

FIG. 14 is a cross-sectional view of the two chain sections at the tow pin transfer area taken along line 14—14 of FIG. 11.

DESCRIPTION OF THE PREFERRED EMBODIMENTS

A low profile truck tow conveyor system is generally indicated in FIG. 1 wherein a wheeled truck 20 rolls on a given surface, such as a floor 21. A vertically movable tow pin 22 is mounted on the front of the truck 20, Pin 22, in its operating position, projects below the level of floor 21 through an open slot 23 (FIG. 2) which defines a chain guideway and rides over the upper surface of a conveyor chain 25 until it reaches a pusher-link 26 where it drops into engagement with a pushing face 27. The chain then pushes the tow pin 22 and the truck 20 as it moves. The chain guideway 23, and the chain 25, define an endless loop only a portion of which is shown and move the trucks 20 around the loop. An independent caterpillar chain drive 30, having a chain 31 with a driving dog 32, engages conveyor chain 25 and propels the conveyor chain. This may be a conventional caterpillar chain drive with two sprockets 33 and 34 and may be mounted in a pit below the floor line. However, in order to eliminate deep pits to be consistent with the advantages of the rest of the low profile conveyor system, the drive, as shown in FIG. 1, may be equipped with a third driving sprocket 35 located far enough away to be out of the path of the truck 20 when its tow pin 22 is engaged in the tow pin slot 23. The third driving sprocket 35 is mounted below the floor level on a shaft extension of a gear reducer 36 mounted above the floor level. A V-belt drive 37 connects the gear reducer 36 to an electric motor 38.

The takeup apparatus of this invention is generally indicated in FIG. 1 wherein the machinery is shown at an acute angle from the tow pin slot and main path of the conveyor. FIG. 3 shows the takeup apparatus of this invention in more detail. The main components comprise a transfer housing 40, a pair of connecting chain tracks 41 and 42 and a takeup housing 43 for the adjustable sprocket. The transfer housing 40 has connected thereto a first and second horizontal curve roller turn assembly 45 and 46, a first and second vertical curve roller turn assembly 47 and 48, a fixed idler sprocket assembly 49, an incoming chain track section 50, and an outgoing chain track section 51. The housing 40 is rectangular in shape and has two removable, diagonally cut floor plates 52 and 53 (see FIG. 1) covering the structure. The diagonally cut sides of the floor plates are spaced apart a small distance to provide a tow pin slot 23 only slightly wider than the diameter of the tow pin 22 on truck 20. This tow pin slot 23 is located at an acute angle with respect to the longitudinal axis of the transfer housing 40. The housing 40 further comprises a bottom 54 with one end 55 sloping to a deeper level, two longitudinal sides 56 and 57, two ends 58 and 59 and necessary stiffening members 60, 61, 62 and 63.

The incoming chain track section 50 as shown in FIG. 7, includes a U-shaped bent plate member 65 and a flat wear bar 66 secured to the inside bottom of member 65. The distance between the upstanding legs of member 65 is slightly greater than the width of the conveyor chain 25. The track section 50 is attached to end 58 of the housing 40 near its midpoint directly under floor plates 52 and 53 and in line with the tow pin slot 23. It extends toward the center of housing 40 at an angle of about 8°30' with respect to the longitudinal axis of the housing and is supported by member 60. The bottom of track section 50 further slopes slightly downward toward its inner end (see FIG. 12) so that the centerline of chain 25 riding on wear bar 66 is depressed about ⅜ inches as it leaves this track section.

From track section 50 the chain 25 is directed around the first horizontal curve roller turn assembly 45, as shown in FIGS. 3, 4 and 11, to a direction parallel with the longitudinal axis A of housing 40. Roller turn assembly 45, as shown in FIGS. 3 and 14, comprises four anti-friction bearing cylindrical rollers 70, an angle shaped bent plate 71 forming a base with a vertical leg, a top plate 72, a curved shim plate 73, a curved wear bar 74, and fasteners 75 and 76. The top plate 72 is welded to the vertical leg of bent plate 71 parallel to the horizontal leg and spaced apart a distance slightly greater than the length of rollers 70. Holes are provided in plate 72 and horizontal leg of plate 71 on a relatively large horizontal radius so that rollers, mounted in these holes on fasteners 75 and 76, will form a horizontal curve. Shim plate 73 and wear bar 74 are secured to the horizontal leg of plate 71 adjacent to the periphery of the rollers to support the chain 25 as it travels around the roller turn. The roller turn assembly 45 is secured to support member 61 with fasteners 77 and 78.

The chain is then supported in connecting track 41, leading to the takeup housing 43. From the takeup housing 43 the chain returns to the transfer housing 40 in connecting track section 42. These will be described in detail later.

From the connecting track section 42 the conveyor chain 25 is then guided over the first vertical curve roller turn 47 in a downwardly inclined direction about 12° below the horizontal. Roller turn assembly 47, as shown in FIG. 3, comprises four anti-friction bearing cylindrical rollers 80, a pair of angle shaped bent plates 81, and fasteners 82 and 83. The bent plates 81 are secured to the bottom 54 of housing 40 with fasteners 84 and 85, similar to fasteners 75 and 76 of FIG. 14. The vertical legs of plates 81 are spaced apart a distance slightly greater than the longitudinal length of rollers 80 and are provided with holes on a relatively large vertical radius so that the rollers 80, mounted in these holes on fasteners 82 and 83, will form a vertical curve.

From the first vertical curve roller turn 47 the conveyor chain 25 is wrapped around the fixed idler sprocket assembly 49, as shown in FIGS. 3 and 4, about 180°. The idler sprocket assembly comprises a six-tooth chain sprocket 90, a pair of sealed ball bearings 91 with extended inner races, a capscrew 92, and a top plate 93. As shown in FIG. 6, the ball bearing units 91 are fitted in the concentric bore of the sprocket 90 so that their inner races extend beyond the ends of the hub slightly. The capscrew 92 is inserted through a hole in the top plate 93, through the bore of the bearing inner races and is threaded into a bar 94 welded to the sloping bottom plate 55 of box 44 to clamp the inner races of the sprocket bearings between the top plate and the housing so the sprocket rotates freely on the bearings. The top plate 93 is removably attached to the housing end 58 through a short angle 95 with fasteners 96 and 97. Sprocket assembly 49 is located on the longitudinal centerline A of housing 40 and is below the incoming track section 50 adjacent to the end 58 of the housing.

From the inclined sprocket assembly 49 the conveyor chain is directed over the second vertical curve roller turn 48. This roller turn 48, as shown in FIGS. 3, 5, 13 and 14, comprises four anti-friction bearing cylindrical rollers 100, a short leg angle bracket 101, a longer leg angle bracket 102 and fasteners 103 and 104. The vertical legs of brackets 101 and 102 are spaced apart a distance slightly greater than the longitudinal length of rollers 100 and are provided with holes on a relatively large vertical radius so that these rollers, mounted in these holes on fasteners 103 and 104, will form a vertical curve. The horizontal legs of brackets 101 and 102 are secured to the bottom 54 of box 44 with fasteners 104 and 105 and the assembly is so arranged that the longer leg bracket 102 is adjacent box side 56 and the short leg bracket 101 is adjacent the incoming section of the conveyor chain 25. The elevation above the bottom plate 54 of the last roller in assembly 48, which is tangent to the horizontal plane, is approximately ⅞ inch lower than the corresponding roller in assembly 47 going toward the idler sprocket since it is desired that the outgoing section of chain 25 in this transfer area be lower than the incoming section of the chain, as shown in FIG. 14.

In the transfer area following the second vertical curve roller turn assembly 48, the conveyor chain 25 is bent around the second horizontal curve roller turn assembly 46 to redirect the chain so that in the outgoing section it is a straight line extension of its path in the incoming section. The horizontal roller turn assembly 46, as shown in FIGS. 3 and 13, comprises three anti-friction bearing cylindrical rollers 110, an angle shaped bent plate 111, a top plate 112, a curved wear plate 113, and fasteners 114 and 115. The top plate 112 is welded to the vertical leg of bent plate 111 parallel to the horizontal leg and spaced apart a distance slightly greater than the length of rollers 110 in the same manner as shown in FIG. 14. Holes are provided in plate 112 and the horizontal leg of plate 111 on a relatively large radius so that the rollers, mounted in these holes on fasteners 114 and 115, will form a horizontal curve. Wear plate 113 is secured to the horizontal leg of plate 111 adjacent to the periphery of the rollers 110 to support the chain in its passage around the rollers. The roller turn assembly 46 is secured to box side 56 with fasteners 116 and 117 at an elevation consistent with the slightly inclined path of the chain from the second vertical curve 48 to the outgoing track section 51, as shown in FIG. 13.

As further shown in FIG. 3, the transfer housing 40 is connected to the takeup housing 43 by a pair of connecting chain tracks 41 and 42. Tracks 41 and 42 are alike except for a slight difference in length. Track 41, as shown in FIG. 8, consists of a U-shaped bent plate member 119, a flat wear bar 120 secured to the inside bottom of member 119, and a top floor plate 121 secured to the tops of the vertical legs of member 119. The distance between the vertical legs of member 119 is slightly greater than the width of the conveyor chain 25. The depth of the vertical legs of member 119 is slightly greater than the depth of the incoming track section 50 at its deeper end and the bottom of track 41 is horizontal. Track 41 is supported in member 62 and end 59 of housing 40 and one end of the takeup housing 43. Track 42 is similarly supported in member 63 and end 59 of housing 40 and one end of the takeup housing 43. The overall length of tracks 41 and 42 is variable and thereby the distance of the takeup housing 43 from the transfer housing for reasons to be discussed later.

The outgoing chain track 51 is shown in FIGS. 5, 9 and 10 and comprises a U-shaped bent plate member 122, a wear bar 123 secured to the inside bottom of member 122, and a pair of tow pin guide bars 124 secured to the inside of the vertical legs of member 122 at the top of each leg from a point where track 51 extends beyond the transfer housing 40. As shown in FIG. 9, the depth of member 122 at the chain entrance end is a maximum of all track sections and is about ½ inch greater than the depth of corresponding track sections 41 and 42. The bottom of track section 51 slopes upward from the chain entrance end to its exit where the depth is the same as standard track depth as shown in FIG. 10.

As shown in FIGS. 3 and 4, the takeup housing 43 is rectangular and has therein a movable sprocket frame 126, a sprocket assembly 127, a pair of compression springs 128, and a pair of guide rods 129. Sprocket assembly 127 comprises a five-tooth chain sprocket 130, a pair of ball bearing units with extended inner races, and a capscrew. This assembly is similar to that of sprocket assembly 49, as shown in FIG. 6, except that the sprocket 130 has five teeth in lieu of the six teeth on sprocket 90 and thus has a smaller pitch diameter. The movable frame 126 comprises a bottom bent plate 133 having two holes in its short vertical leg for the guide rods 129, a top bent plate 134 having a short vertical leg overlapping and welded to the vertical leg of plate 133 and having a countersunk hole in the horizontal portion adjacent its outer end, a flat head capscrew 135, and a short internally threaded bar 136 welded to the horizontal portion of bottom plate 133 in alignment vertically with the countersunk hole in top plate 134. The sprocket assembly 127 is mounted between the top plate 134 and the bottom plate 133 and capscrew 135 is inserted through the countersunk hole, through the bore of the inner races of the sprocket bearing units, and is threaded into the tapped hole in bar 136. The capscrew is tightened to clamp the inner races between the top plate 134 and bar 136 to permit the sprocket to rotate freely on the bearing units. The takeup housing 43 includes a bottom 137, two longitudinal sides 138 and 139, two ends 140 and 141, a floor plate cover 142 and fasteners 143 and 144. Two holes are provided in box end 141 adjacent the sides of housing 43 for securing the guide rods 129 and two slots are provided in end 140 for receiving track sections 41 and 42. The guide rods 129 are long, round rods having a long thread 145 on one end and a short thread 146 on the other end. Two short flat bars 147 are each welded to the bottom 137 and sides 138 and 139 respectively adjacent housing end 140. Bars 147 are further provided with a vertical slot to accept the ends of the guide rods 129. In assembly the movable takeup frame 126 with the mounted sprocket assembly 127 are placed in position on the bottom of housing 43. Each of the guide rods 129 is inserted through the holes in housing end 141, through the holes in the movable frame 126, and a spring retainer cap 148 is mounted over the long threaded end 145 of the rod. A spring 128 is then assembled over the guide rod against cap 148 and a second spring retainer cap 148 is added, followed by two nuts 149 to adjust and lock the tension of the spring. An additional nut is added to end 145 of the rod and the assembled rod is then inserted through the slot in bars 147. A second nut is then added to the end 145 of the guide rod beyond bar 147. A nut 149 is also placed on each side of housing end 141 on the short end 146 of each guide rod 129 to complete the assembly. The takeup frame can then be positioned by adjusting the nuts at the end of the springs 128. Cover plate 142 is secured to the takeup housing 43 with fasteners 143 and 144. The takeup housing 43 is so located that the centerline of chain 25 leaving the pitch radius of adjustable sprocket 130 is in a straight line parallel to the longitudinal axis A of the transfer housing 40 directly in alignment with the corresponding pitch radius of fixed sprocket 90. Thus the longitudinal centerline B of takeup housing 43 is offset from the longitudinal centerline of the transfer housing 40 due to the difference in pitch diameter of the adjustable sprocket 130 and the fixed sprocket 90.

OPERATION

In operation truck 20 will be propelled along the endless conveyor chain by the tow pin 22 of the truck projecting into the tow pin slot 23 and engaging a chain pusher-link 26. When the tow pin reaches the takeup apparatus of this invention, it will transfer from the incoming section of endless chain 25 to the outgoing section while the slack in the chain is being eliminated through automatic movement of the expandable turn means comprising the adjustable chain sprocket assembly 127 and the movable frame 126 during the period that the chain is free of the tow pin.

The conveyor chain approaches the transfer housing 40 at a standard depth where the centerline of the chain is about 1-15/6 inches below the floor level 21. the chain enters the incoming track section 50 where it is further lowered about ⅜ inch by the time it leaves this track and enters the tow pin transfer area. At this point the tow pin slot in the floor plates of the transfer housing 40 continues in a straight path but the incoming chain is bent slightly around the first guide means comprising the first horizontal curve roller turn 45. The tow pin 22 in the pusher-link 26 then slides sideways as it proceeds forward until it is free of the pusher-link. As shown in FIGS. 11 and 14, there is a second portion of the chain closely adjacent to the incoming section and slightly lower in elevation. The tow pin thus slides from the pocket in the pusher-link to the top of the adjacent portion of chain in a few inches.

When the incoming chain section leaves the tow pin transfer area, it enters the horizontal connecting track section 41 where it is guided to the takeup housing 43 and the expandable turn means. Here the loop of chain is trained around the adjustable sprocket assembly 127 which is mounted in the movable frame 126. The latter frame is controlled by springs that automatically apply tension on the chain through the sprocket causing the frame to move and take up what slack may occur until the limit of its movement is reached. Then links of chain, in multiples of two links, may be manually removed and the frame readjusted to permit automatic operation again. The tension on the chain may be adjusted within wide limits by adjusting the nuts 149 on the guide rods 129 adjacent to the rear spring retainer caps 148. From the adjustable sprocket the chain enters the second connecting track 42 and is directed to the transfer housing 40 again.

Connecting tracks 41 and 42 are made in various lengths so that the overall length of chain from the fixed idler sprocket to the adjustable sprocket and return can be selected to be a multiple of the chain pusher-link spacing. Normal spacing of pusher-links is a function of the truck length and the overall length of any object carried on the truck and usually varies from 6 feet 0 inches to 16 feet 0 inches. The object of controlling the centers of the fixed and adjustable sprockets is to ensure that a pusher-link on the portion of chain travelling toward the tow pin transfer area from the fixed sprocket will be approaching, but lagging behind, the pusher-link on the incoming section of chain at the tow pin transfer area by a minimum distance of only 8 inches. Since the gap between the two sections of chain at the transfer, as controlled by the spacing of the horizontal roller turns 45 and 46, is so small and less than the diameter of the tow pin, the tow pin is already partially on the adjacent chain section before it fully leaves the incoming section of chain. Thus when the tow pin slides out of engagement with the incoming pusher-link and on to the top of the adjacent chain at the transfer area, a following pusher-link will be quickly available to engage the tow pin. The latter pusher-link then quickly picks up the tow pin and positively propels the truck forward once again. With the short transfer area and the closely spaced following pusher-link of this invention, positive engagement with the tow pin is usually made before the truck has lost its momentum and stopped.

When the chain leaves the connecting track 42 it is directed over the first vertical curve roller turn 47 on an incline of about 12° below the horizontal to the fixed idler sprocket assembly 49. The lowered, inclined position of this sprocket assembly permits the chain to pass around the sprocket about 180° under the incoming track section 50. The chain then passes over the second vertical curve 48 to bring the chain approximately back to the horizontal plane, but since vertical roller turn 48 is closer to the fixed sprocket 90 than the first vertical roller turn 47, the elevation of the chain will be approximately ⅞ inch lower as it approaches the transfer area as shown in FIG. 14. Due to the intentionally larger diameter of fixed sprocket 90, the centerline of the chain leaving sprocket 90 is beyond the incoming section of chain but closely adjacent to it as shown in FIG. 11. The actual transfer area of the tow pin from the incoming chain to the outgoing chain sections, which are at a slight angle to the chain going to sprocket 130, occurs as the chains are articulating around the horizontal roller turns 45 and 46 under the tow pin slot in the floor plates.

From the second guide means, which includes the second horizontal roller turn 46, the outgoing chain enters the outgoing track section 51, as shown in FIGS. 5 and 13. The bottom of this track section slopes upward so that at the end of this track section the chain has once again reached its normal elevation and continues on its standard depth track sections around the remainder of the conveyor path.

Although the best mode contemplated for carrying out the present invention has been herein shown and described, it will be apparent that modifications and variations may be made without departing from what is regarded to be the subject matter of the invention.

What is claimed is:

1. Takeup apparatus for removing slack in an endless chain of a truck tow conveyor system having an independent drive for propelling the chain, the combination which comprises:
   a. a truck operating surface having a continuous truck tow pin slot;
   b. expandable turn means on an axis oriented at a slight angle from said tow pin slot receiving a substantially horizontal loop of the chain to support the chain;
   c. first guide means located under said tow pin slot directing an incoming section of the chain through a change in direction from said tow pin slot and toward said turn means whereby the tow pin leaves the incoming chain section; and
   d. second guide means spaced in close proximity to said first guide means receiving a return run of the chain from said turn means to redirect said run to a path again in vertical alignment with the tow pin slot whereby the truck tow pin transfers from the incoming section of chain directly to the closely adjacent chain run while the tow pin remains continuously in the tow pin slot.

2. The takeup apparatus of claim 1, wherein said turn means comprises a freely rotatable sprocket engaging the loop of the chain and a movable frame supporting said sprocket, which movement takes up slack in the chain.

3. The takeup apparatus of claim 2, wherein said turn means further includes spring means associated with said movable frame for automatically maintaining tension in the chain.

4. The takeup apparatus of claim 2, wherein said sprocket is horizontal and rotatable about a vertical axis.

5. The takeup apparatus of claim 2, wherein said turn means is located at a sufficient distance from the tow pin slot that said turn means requires a depth only slightly greater than that of the chain.

6. The takeup apparatus of claim 1, wherein said first guide means comprises a first horizontal curve turn for guiding the incoming section of chain and said second guide means comprises a second horizontal curve turn for guiding the return run of chain so that the two sections of the endless chain are substantially side-by-side in a short area vertically under the tow pin slot.

7. The takeup apparatus of claim 6, wherein said second guide further further comprises a slightly inclined, freely rotatable turn wheel located under the incoming chain section, a first vertical curve adjacent said turn wheel for guiding the return run of chain from a horizontal plane to the inclined plane of said turn wheel, and a second vertical curve adjacent said turn wheel but located on a side opposite to that of said first vertical curve for guiding the return run of chain from said inclined turn wheel to said second horizontal curve at an elevation slightly lower than said incoming chain section at said first horizontal curve turn whereby the return run at the point where the tow pin moves laterally from the incoming chain to the return run is below the level of the incoming chain.

8. The takeup apparatus of claim 1, wherein the chain further comprises a first and second pusher-link, the spacing of these pusher-links relative to the chain length from said first guide means around said expandable turn means to said second guide means is such that said first pusher-link in the incoming chain section, when located at said first guide means, slightly precedes said second pusher-link in said return run of chain whereby the second pusher-link quickly engages the tow pin after it leaves the incoming chain section without appreciable loss in motion of the tow pin and ensures a positive transfer of the tow pin from one section to the adjacent section of chain.

9. The takeup apparatus of claim 8, wherein said first and second guide means are horizontal curve turns spaced in close proximity to each other so that the incoming chain section passes around said first guide means on a slight curve and the return run of chain passes around said second guide means on a slight curve in the opposite direction and the tow pin slides laterally from one chain section to the other at their closest points of tangency.

10. Takeup apparatus for removing slack in an endless conveyor chain of a truck tow conveyor system including a chain track having a tow pin slot, an independent drive for propelling the chain and a materials handling truck rolling on a surface above the chain track and having a tow pin depending from the truck engaging a pusher-link in the chain for advancing the truck, the combination which comprises:
 a. a transfer housing having a cover plate flush with the truck operating surface and a tow pin slot therein;
 b. a means for guiding the conveyor chain through a transfer area within said housing for positively transferring the truck tow pin from an incoming section to an outgoing section of the endless chain, the tow pin being in said slot, said means comprising a first horizontal curve turn in said housing guiding the incoming chain section away from the tow pin slot at a slight angle and a second horizontal curve turn in said housing in close proximity to said first horizontal curve turn guiding the outgoing chain section adjacent to the incoming chain section at a spacing less than the diameter of the tow pin and to redirect the path of the outgoing chain section to be again under the tow pin slot at a slight distance beyond the point at which the incoming chain section moved away from the tow pin slot;
 c. adjustable takeup means associated with the incoming chain section beyond the tow pin transfer area in which slack in the chain is removed while the tow pin is disengaged; and
 d. fixed turn means located in said housing for redirecting the chain from said adjustable takeup means to a path closely adjacent to the incoming chain section at the tow pin transfer area.

11. The takeup apparatus of claim 10, wherein the fixed turn means is inclined and is located in a deeper inclined section of one end of said housing under the incoming chain section and the means for guiding the conveyor chain further comprises a first vertical curve turn adjacent said fixed turn means guiding the chain leading to said inclined turn means and a second vertical curve turn adjacent said fixed turn means but located on an opposite side thereof to said first vertical curve turn guiding the outgoing chain section returning from said inclined turn means to the transfer area whereby the outgoing chain section adjacent to the incoming chain section at the transfer area is at a slightly lower elevation and, before the tow pin slides laterally out of complete engagement with the pusher-link of the incoming chain section, it will partially rest on the adjacent outgoing chain section to be engaged by a following pusher-link.

12. The takeup apparatus of claim 10, wherein the outgoing chain section has a second pusher-link spaced relative to the chain length from said first horizontal curve turn around said adjustable takeup means and horizontal curve turn so that it closely follows a first pusher-link in the incoming chain section when the first pusher-link is in the tow pin transfer area whereby the tow pin is quickly engaged by the pusher-link in the outgoing chain section without appreciable loss of motion.

13. The takeup apparatus of claim 10, wherein the adjustable takeup means comprises a takeup housing, a movable frame within said takeup housing having a sprocket mounted to rotate freely therein about a vertical axis and biasing means to automatically move the frame to maintain tension in the chain.

14. In a truck tow conveyor system including an endless flat top conveyor chain having vertical connecting pins and running in a track below the surface on which a materials handling truck rolls, an independent drive for propelling the chain, a tow pin depending from the truck through a slot in said surface defining the path of the conveyor and said tow pin engaging a pusher-link in said chain for advancing the truck, takeup apparatus for removing slack in the endless chain which comprises:
 a. a transfer housing having a cover plate flush with the truck operating surface, including a continuous straight tow pin slot through the area of said housing;
 b. an incoming section of said chain operating within said housing directly under the tow pin slot;
 c. first turn means mounted in said housing guiding said incoming chain section in a direction away from the tow pin slot at a small angle to disengage the tow pin from the pusher-link of the chain;

d. an adjustable horizontal sprocket assembly aligned with but spaced from said first turn means having said chain partially trained around said sprocket assembly;

e. a fixed idler sprocket assembly located in said housing under said incoming chain section having the chain returning from said adjustable sprocket assembly partially trained about the fixed sprocket;

f. means for guiding the chain from said fixed sprocket assembly to a transfer area in said housing under the tow pin slot closely adjacent to said first turn means at an elevation slightly below that of said incoming chain section; and g. an outgoing chain section operating beneath the tow pin slot within said housing in a direction away from the transfer area, whereby the tow pin transfers diagonally from the incoming section of chain to the outgoing chain section in a minimum travel distance, is re-engaged with the next following pusher-link and proceeds out of the opposite end of said housing while confined in the straight tow pin slot.

15. The takeup apparatus of claim 14, wherein said first turn means comprises a horizontal curve roller turn including a plurality of vertically mounted anti-friction rollers.

16. The takeup apparatus of claim 14, wherein the adjustable sprocket assembly comprises a takeup housing, a movable frame within said takeup housing having a sprocket mounted to rotate freely therein about a vertical axis, a pair of horizontal guide rods mounted through the sides of the movable frame and secured to the takeup housing, fastening means on the guide rods and spring means to maintain tension on the two portions of the chain trained around the sprocket and to move the frame to take up any accumulated slack in the chain while controlled by the guide rods.

17. The takeup apparatus of claim 14 further comprising a first U-shaped chain track, a first wear bar in the bottom of said first track and a first cover plate secured to the top of the chain track connecting said transfer housing with the takeup housing for supporting the chain leading to the adjustable sprocket assembly and a second U-shaped chain track, a second wear bar in the bottom of said second track and a second cover plate secured to the top of the second chain track connecting the takeup housing with said transfer housing for supporting the chain leading to the fixed idler sprocket assembly.

18. The takeup apparatus of claim 17, wherein the lengths of the first and second chain tracks are variable, dependent upon the spacing of the pusher-links in said conveyor chain, whereby when a first pusher-link on the incoming chain section is located at the tow pin transfer area, a second pusher-link on the section of chain from the fixed sprocket will be closely following the first pusher-link so that the truck tow pin will be quickly and positively engaged by the second pusher-link.

19. The takeup apparatus of claim 14, wherein the fixed idler sprocket assembly comprises a sprocket having anti-friction bearing means mounted on an upright pin secured between the base of said housing and an upper plate secured to one end of said transfer housing below said incoming chain section so the idler sprocket rotates freely and the chain passes around the sprocket, said sprocket being larger in diameter than the sprocket in the adjustable sprocket assembly.

20. The takeup apparatus of claim 19, wherein the bottom end portion of said transfer housing is inclined downwardly at a small angle, said fixed idler sprocket assembly is mounted in this inclined section below the incoming chain section without interference and a first vertical curve roller turn including a plurality of horizontally mounted anti-friction rollers is provided in said transfer housing adjacent said fixed idler sprocket assembly to guide the chain smoothly from the adjustable sprocket to the inclined fixed sprocket.

21. The takeup apparatus of claim 14, wherein the means for guiding the chain from said fixed sprocket assembly comprises a second vertical curve roller turn adjacent said fixed idler sprocket assembly including a plurality of vertically mounted anti-friction rollers so located in said transfer housing adjacent said first turn means that the chain leaving the larger fixed sprocket reaches the tow pin transfer area in a position closely adjacent to the incoming chain section at a slightly lower elevation and this outgoing chain section is guided around the second horizontal curve turn to return the chain to a path directly under the tow pin slot, which chain path is a straight line extension of the incoming chain section.

* * * * *

UNITED STATES PATENT OFFICE
CERTIFICATE OF CORRECTION

Patent No. 3,714,903  Dated February 6, 1973

Inventor(s) Chester A. Rosenberger Jr. et al

It is certified that error appears in the above-identified patent and that said Letters Patent are hereby corrected as shown below:

Column 8, line 57, change "the" (first occurrence) to --The--.

Column 11, line 5, delete "further" (first occurrence) and insert therefor --means--.

Signed and sealed this 5th day of November 1974.

(SEAL)
Attest:

McCOY M. GIBSON JR.  C. MARSHALL DANN
Attesting Officer  Commissioner of Patents